United States Patent [19]

Brown

[11] Patent Number: 5,092,521

[45] Date of Patent: Mar. 3, 1992

[54] HEATER SYSTEM FOR THE PASSENGER COMPARTMENT OF A MOTOR VEHICLE

[75] Inventor: David G. Brown, Southleigh, England

[73] Assignee: Rover Group Limited, United Kingdom

[21] Appl. No.: 578,782

[22] Filed: Sep. 6, 1990

[30] Foreign Application Priority Data

Sep. 11, 1989 [GB] United Kingdom ............... 8920488

[51] Int. Cl.[5] ............................................. B60H 1/02
[52] U.S. Cl. .............................. 237/12.3 B; 165/101; 165/103
[58] Field of Search ............ 237/2 A, 12.3 A, 12.3 B, 237/12.3 C, 2 A; 165/101, 102, 103

[56] References Cited

U.S. PATENT DOCUMENTS

| | | | |
|---|---|---|---|
| 3,195,622 | 7/1965 | Haufler et al. | 165/101 |
| 3,990,504 | 9/1976 | Koltmann . | |
| 4,427,056 | 1/1984 | Johnson et al. | 237/12.3 B |
| 4,559,994 | 12/1985 | Waldmann et al. . | |
| 4,815,658 | 3/1989 | Hidemitsu et al. | 237/12.3 B |

FOREIGN PATENT DOCUMENTS

| | | |
|---|---|---|
| 613857 | 4/1926 | France . |
| 300382 | 11/1928 | United Kingdom . |
| 306010 | 2/1929 | United Kingdom . |
| 708046 | 4/1954 | United Kingdom . |
| 1129404 | 10/1968 | United Kingdom . |
| 1161685 | 8/1969 | United Kingdom . |
| 1460530 | 10/1973 | United Kingdom . |
| 2127182 | 4/1984 | United Kingdom . |
| 2199132 | 12/1987 | United Kingdom . |
| 2216249 | 4/1989 | United Kingdom . |

Primary Examiner—Henry A. Bennett
Attorney, Agent, or Firm—Davis, Bujold & Streck

[57] ABSTRACT

A heater system for the passenger compartment of a motor vehicle comprises a number of heat exchange elements arranged in a stack. Flow of engine coolant through each of the heat exchange elements is individually controlled by valve means having a coolant inlet and a coolant outlet and which includes a valve member which can progessively open the flow of coolant to the heat exchange elements by uncovering staggered supply orifices. The heat exchange elements are in parallel with a bypass passage which allows flow from the coolant inlet to the coolant outlet through a bypass orifice. The bypass orifice becomes progressively blocked as the valve member uncovers the supply orifices.

4 Claims, 5 Drawing Sheets

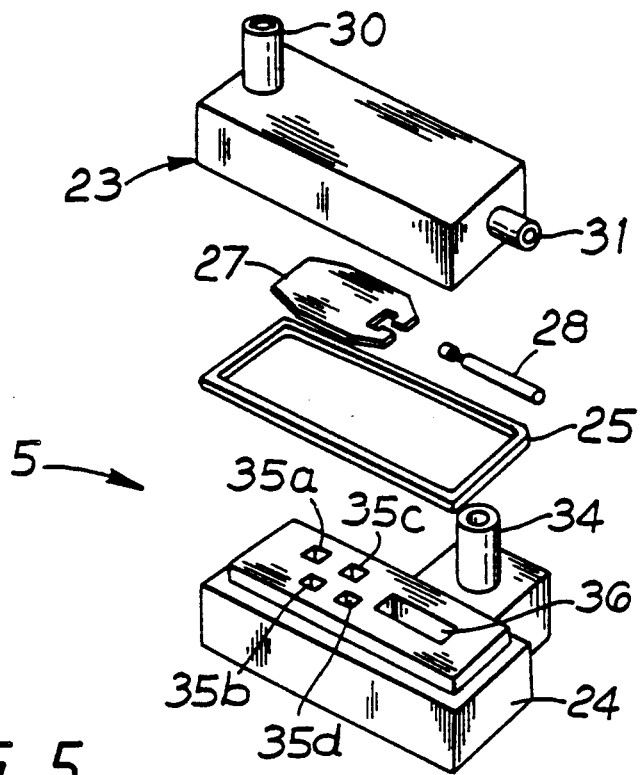
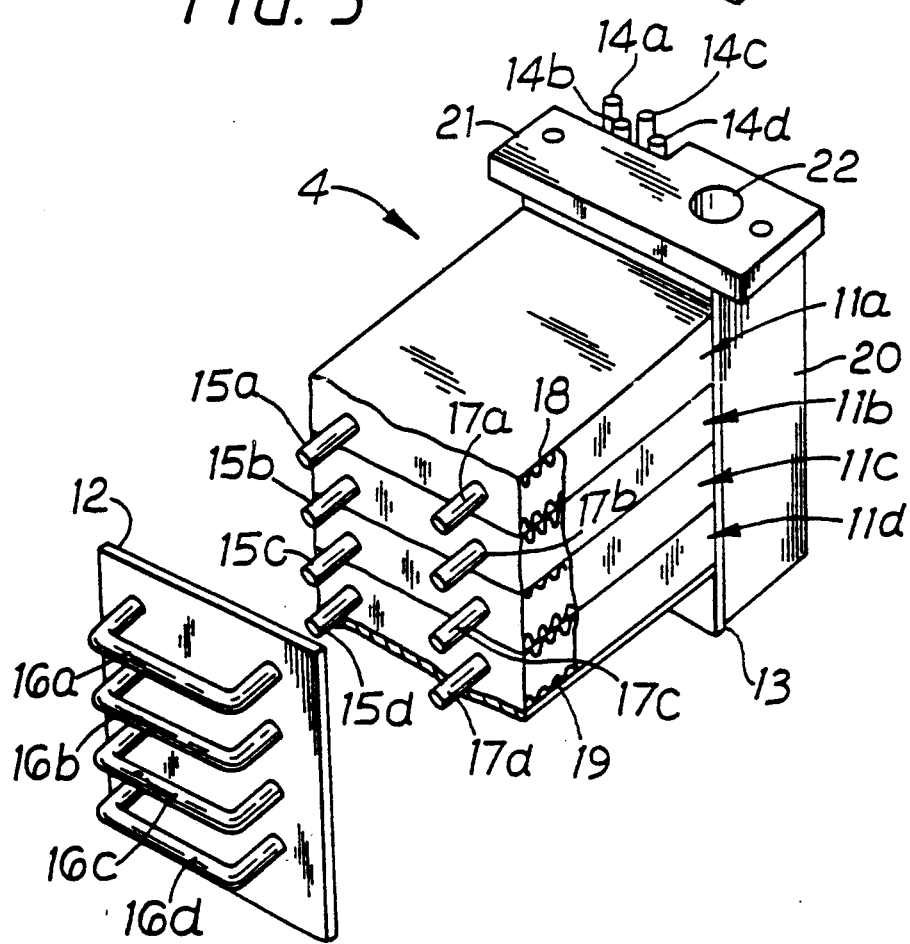
FIG. 5

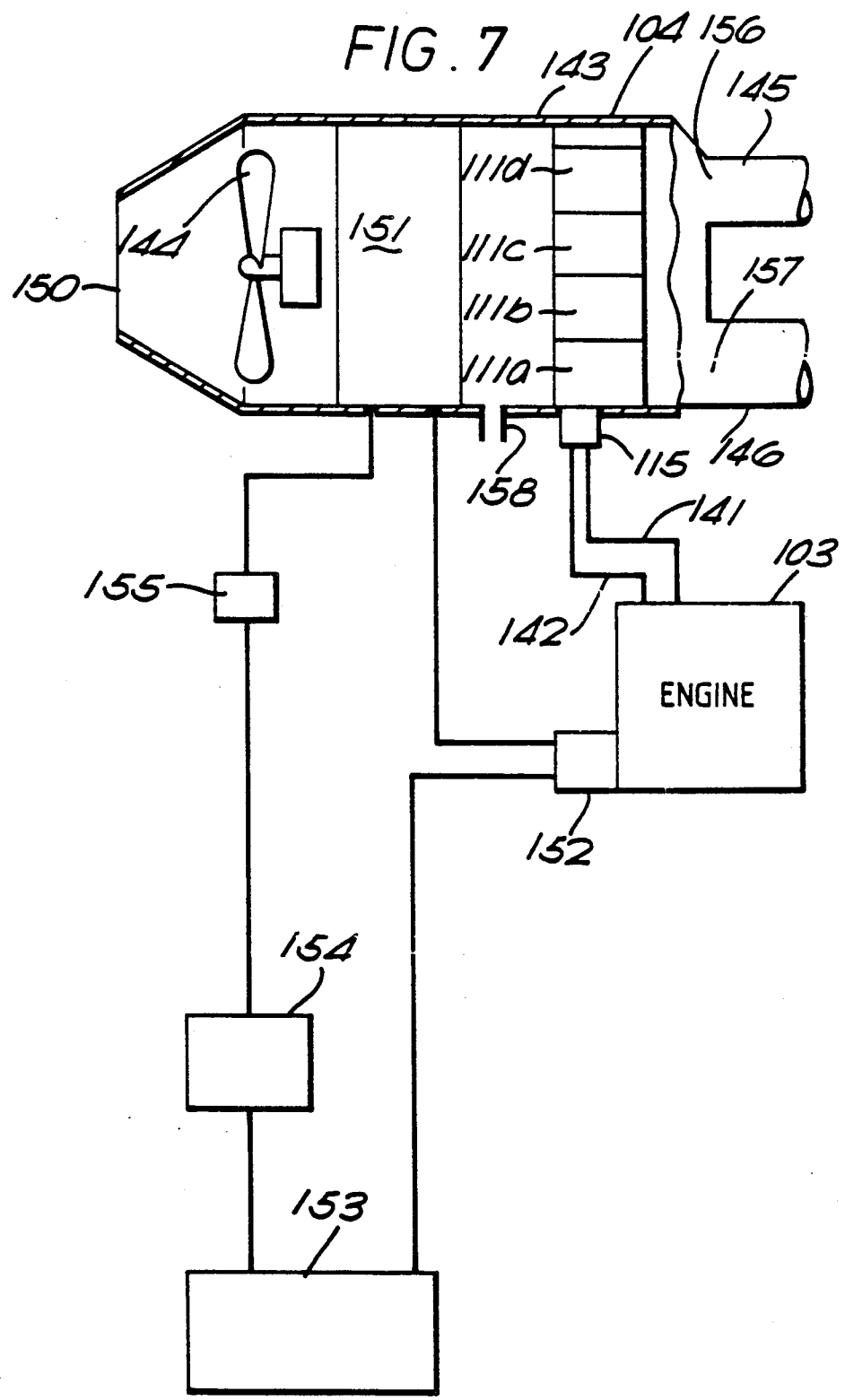

HEATER SYSTEM FOR THE PASSENGER COMPARTMENT OF A MOTOR VEHICLE

This invention relates to a heater system for the passenger compartment of a motor vehicle and to heat exchangers forming part of such systems.

It is known to provide a heat exchanger for a motor vehicle passenger compartment heater system in which a plurality of tube lengths extend between spaced apart support plates, the ends of the tube lengths projecting through the plates with adjacent ends being connected by arcuate tube portions which link together the tube lengths in series to form a sinuous conduit for engine coolant. Air passages are provided between the support plates by a series of fins which lie in spaced-apart, face to face relationship perpendicular to the longitudinal axes of the tube lengths.

A method of controlling the amount of heat emitted by the heat exchanger is to use a control valve to regulate the flow of engine coolant through the heat exchanger. Therefore to reduce the heat emitted from the heat exchanger the flow of engine coolant is reduced.

It is a problem with such prior art heat exchangers that as the engine speed is varied the flow of coolant through the engine is also varied and hence the flow of engine coolant through the heat exchanger is varied for a single valve position. This has the undesirable effect of producing fluctuations in the amount of heat emitted from the heat exchanger for a single valve position resulting in unwanted changes in the temperature of the passenger compartment. Such variations are particularly noticable when the flow of engine coolant is being restricted to produce a heat output from the heat exchanger well below the maximum obtainable.

The operating characteristics of known heat exchangers and control valves is shown in FIGS. 1 and 2 of the accompanying drawings of which:

Figure 1:
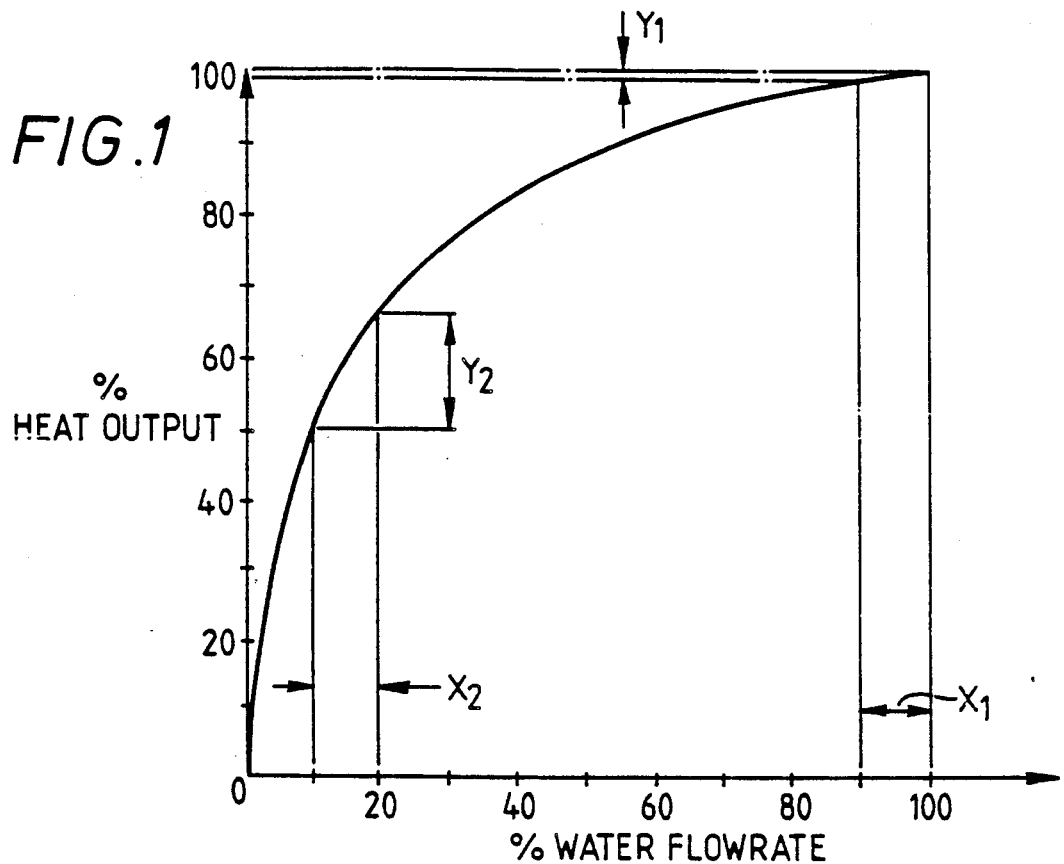
FIG. 1 is a graph of heat output versus fluid flow for a heat exchanger.

For example, with reference to FIG. 1 a small change "X1" in the flow rate of engine coolant near the maximum flow rate produces a small change "Y1" in heat output from the heat exchanger out the same change "X2" in flow rate of engine coolant at a low flow rate produces a much larger change "Y2" in heat output from the heat exchanger.

Figure 2:
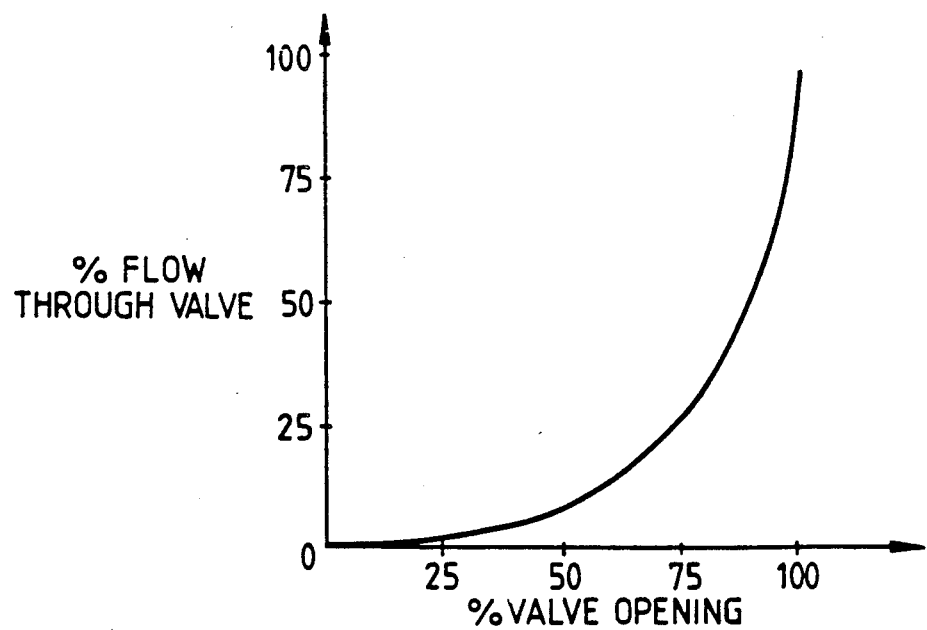
FIG. 2 is a graph of fluid flow rate versus valve opening.

To try and linearise the relationship between heat output and flow rate prior art heat exchangers use a control valve with the characteristic shown in FIG. 2.

Such control valves are however expensive and difficult to produce and only offer a poor solution to the problem of heat output fluctuations.

It is an object of this invention to overcome the disadvantages of the prior art.

According to the invention there is provided a heater system for the passenger compartment of a motor vehicle, the system comprising a housing forming a mixing chamber having an air inlet and at least one air outlet, blower means for inducing air flow from said air inlet to the or each air outlet, duct means for conducting air from the or each air outlet into the passenger compartment, a coolant inlet and a coolant outlet, a heat exchanger comprising a number of heat exchange elements arranged in a stack and each having a conduit for engine coolant to flow between the coolant inlet and the coolant outlet and air passages for air flowing between the air inlet and the air outlet, and a control valve means for controlling the flow of engine coolant through said conduit, wherein the control valve means selectively controls flow of engine coolant through each heat exchange element.

Preferably the heat exchange elements are arranged in parallel between the inlet and the outlet, in which case there may be n heat exchange elements and the valve means is operable to allow flow through a progressively increasing number of heat exchanger elements ranging between 0 and n. In a preferred embodiment of the invention n is four.

The control valve means may comprise a bypass passage which allows engine coolant to flow from the coolant inlet to the coolant outlet without passing through a heat exchange element when flow through one or more heat exchange elements is prevented and flow through the bypass passage may be controlled by the opening of a bypass orifice.

The valve means may comprise a valve body defining a valve chamber, a number of ports in the valve body opening into the valve chamber, each of the ports being connected to a respective one of said heat exchange elements, an inlet to the valve chamber and a valve member movable to selectively control flow between the inlet and each port. Where there is a bypass orifice the valve member may be arranged to progressively restrict flow through the bypass passage.

Advantageously, the ports may be arranged in a staggered configuration so that as one port becomes fully open another port starts to open. The valve body may comprise a valve plate for sliding cooperation with the valve member. The valve member and the valve plate may be of sintered ceramic material.

The system may further comprise an engine driven compressor an evaporator, a condensor and an expansion valve, the evaporator being mounted in the housing to provide a cooling effect to the air before it enters the heat exchanger.

Figure 3:
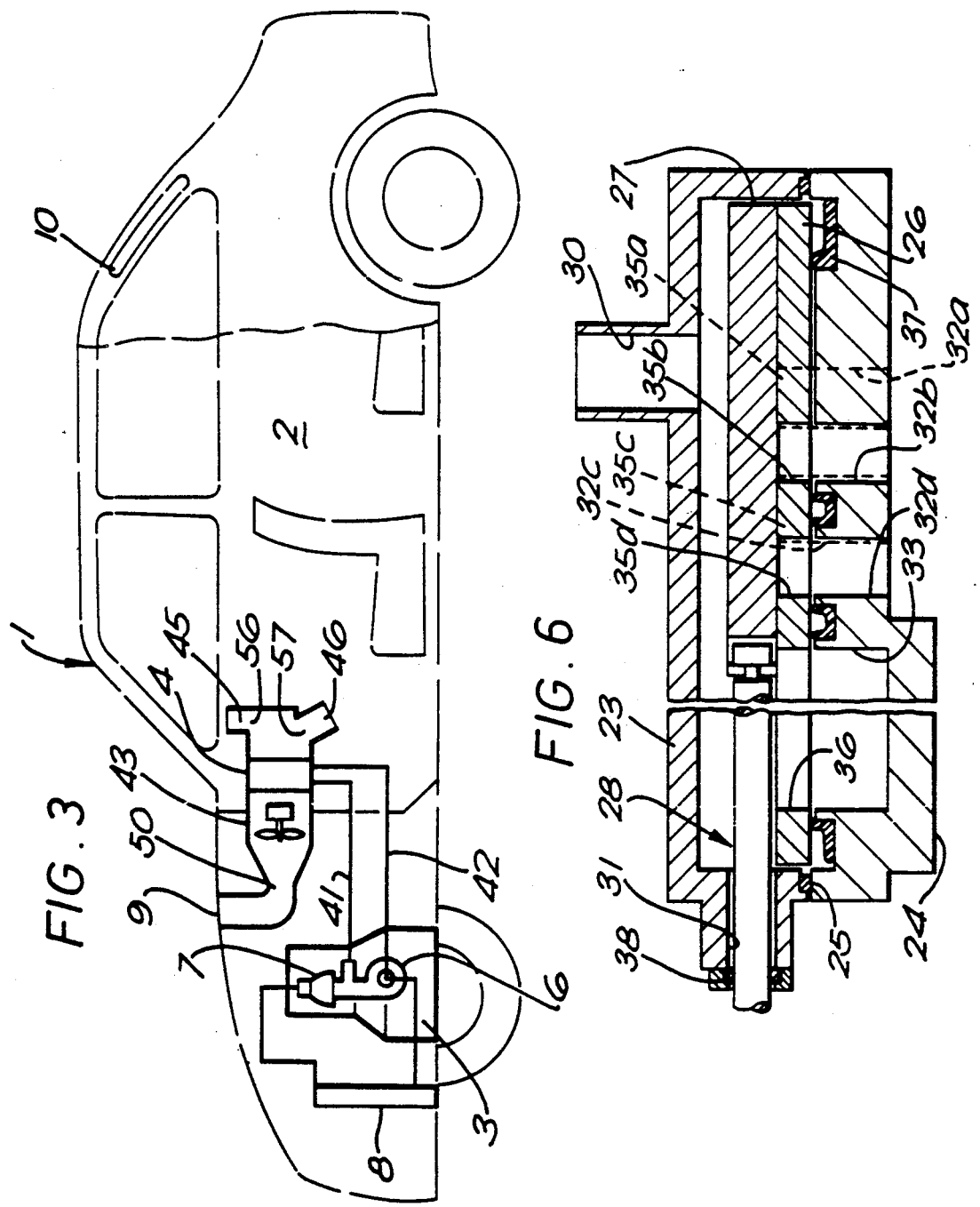
Figure 4:
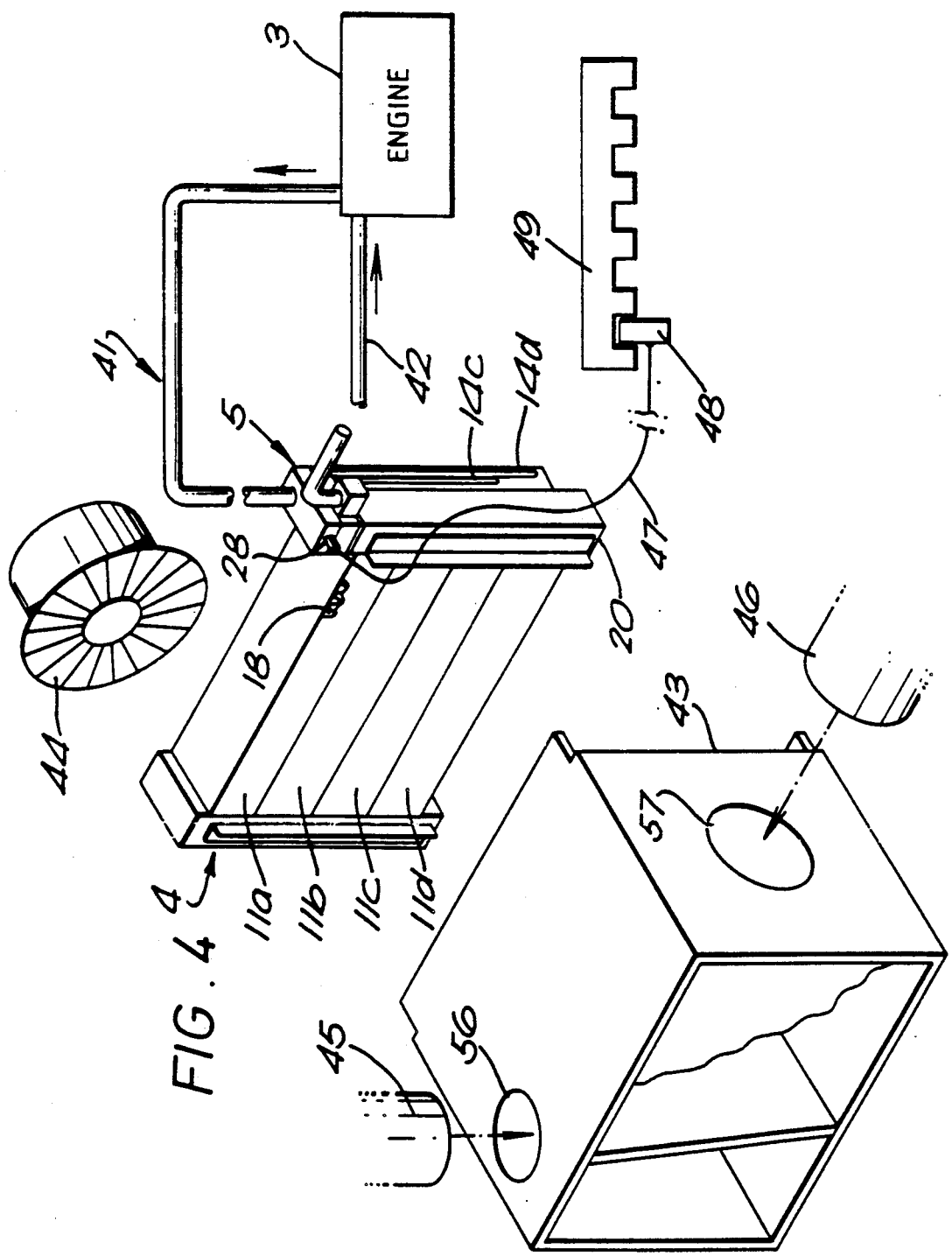

The invention will now be described by way of example with reference to FIGS. 3 to 7 of the accompanying drawings, of which:

FIG. 3 is a pictorial part sectional representation of a motor vehicle including a passenger compartment having a heater system according to the invention;

FIG. 4 is a diagrammatic perspective view of the heater system shown in FIG. 3;

FIG. 5 is an exploded perspective view a heat exchanger and control valve of the heater system shown in FIG. 4;

FIG. 6 is a staggered cross-section through the control valve shown in FIG. 5; and FIG. 7 is a schematic diagram of a modified heater system for the passenger compartment of a motor vehicle according to the invention.

With reference to FIG. 3, a motor vehicle 1 has a passenger compartment 2 and an internal combustion engine 3. The passenger compartment has a heater system which includes a heat exchanger 4 which takes not engine coolant from an inlet hose 41 and returns it to the engine through an outlet hose 42. The coolant is circulated by an engine driven pump 6 and during normal engine operation is maintained within a close temperature range by means of a thermostat valve 7 and a radiator 8.

A blower fan 44 is driven by an electric motor and provides blower means for inducing air flow from an air inlet 50 in a housing 43 enclosing the fan and the heat exchanger 4 to air outlets 56 and 57. Outlet 56 is connected to a duct 45 for directing air flow close to the windscreen and outlet 57 is connected to a duct 46 for directing air flow close to the seats in the passenger compartment 2.

The air inlet 50 is connected by a duct to an opening 9 in the vehicle bonnet or hood. When the vehicle is moving forward at speed the opening 9 is in an area of relatively high pressure and when combined with extractor vents 10 close to the rear of the vehicle in an area of relatively low pressure also comprises blower means for inducing air from the inlet 50 to the outlets 56 and 57 to supplement or replace the blower fan 44.

With further reference to FIGS. 4 to 6 the heat exchanger 4 has four heat exchange elements 11a, 11b, 11c and 11d arranged in a stack between two end plates 12 and 13.

Each of the heat exchange elements 11a, 11b, 11c and 11d has a conduit for engine coolant formed by an inlet tube 14a, 14b, 14c, 14d, a supply tube 15a, 15b, 15c, 15d, a transfer tube 16a, 16b, 16c, 16d and a return tube 17a, 17b, 17c, 17d and a number of air passages 18 defined by a corrugated strip 19.

Each return tubes 17a, 17b, 17c, 17d is connected to an end tank 20 mounted on the end plate 13.

A support plate 21 is mounted on one end of the end plate 13 and has an aperture 22 opening into the end tank 20 to provide an outlet therefrom.

The support plate 21 is provided to support a valve assembly 5 associated with the heat exchanger.

The valve assembly 5 comprises a valve body having an upper member 23, a lower member 24, a valve plate 26 and a seal 25 interposed between the upper and lower body members 23 and 24,. A valve member 27 is connected to an actuator rod 28 which is guided in a passage 31 in one end of the upper body member 23 and sealed by a seal 38.

The upper body member 23 defines a cavity 29 which in combination with the lower body member 24 defines a valve chamber into which is fitted the valve plate 26 and the valve member 27. A stub pipe 30 in the upper body member 23 defines a coolant inlet and is connected to the inlet hose 41.

The lower body member 24 has four supply ports 32a, 32b, 32c, 32d each of which is connected to a respective one of the inlet tubes 14a, 14b, 14c and 14d and one bypass passage 33 which is connected to both the aperture 22 and a coolant outlet in the form of an outlet stub pipe 34 connected to the outlet hose 42.

The valve plate 26 is a sintered ceramic component and has four supply orifices 35a, 35b, 35c, 35d aligned with the supply ports 32a, 32b, 32c, 32d and a bypass orifice 36 aligned with the bypass passage 33. The valve member 27 is also a sintered ceramic component and is slidable over the valve plate 26 without a need for additional seals.

A seal 37 is interposed between the valve plate 26 and the lower body member 24.

In operation engine coolant enters via the stub pipe 30 and passes into the chamber defined by the cavity 29. With the valve member 27 in the position shown in FIG. 6 all the incoming coolant passes through the chamber and exits via the bypass orifice 36 and the bypass passage 33, the valve member 27 obscuring all of the supply orifices 35a, 35b, 35c, 35d.

Therefore with the valve member 27 in the position shown in FIG. 6 none of the first heat transfer fluid enters the heat exchange elements 11a, 11b, 11c and 11d.

As the valve member 27 is moved to the left (from the position as shown in FIG. 6) by moving the actuator rod 28, supply orifice 35a is revealed to allow engine coolant to pass through the orifice 35a and its respective supply port 32a and into the heat exchange element 11a via the inlet tube 14a.

Engine coolant then passes through the supply transfer and return tubes 15a, 16a, 17a and enters the end tank 20.

The engine coolant returned to the end tank 20 then flows via the aperture 22 into the passage 33 and then out of the valve assembly 5 via the outlet pipe 34.

Further movement of the valve member 27 to the left will sequentially connect the second, third and fourth heat exchange elements 11b, 11c and 11d in the manner described above thereby providing sequential connection of the heat exchange elements 11a, 11b, 11c, 11d.

The supply orifices 35a, 35b, 35c, 35d and the supply ports 32a, 32b, 32c, 32d are arranged in staggered formation so that as the first port 32a becomes fully open the next port 32b starts to open and so on.

During the leftward movement of the valve member 27 the bypass orifice 36 is gradually obscured by the valve member 27 and the pressure drop between the aperture 30 and the passage 33 is therefore maintained substantially constant irrespective of the number of heat exchange elements 11a, 11b, 11c, 11d in use.

The amount of heating effect supplied to the air in ducts 45 and 46 is primarily dependent upon the number of heat exchange elements 11a, 11b, 11c, 11d supplied with the first heat exchange fluid.

The actuator rod 28 is movable by means of a control cable 47 which is connected to a control lever 48 arranged for co-operation with a five position heater control slide 49.

As the control lever 49 is moved from the first position (as shown on FIG. 4) to the fifth position the heat output from the heat exchanger is increased as more of the heat exchange elements 11a, 11b, 11c, 11d are connected in parallel between the inlet hose 41 and the outlet hose 42 by means of the valve assembly 5.

With this arrangement each heat exchange element 11a, 11b, 11c, 11d is either connected and receiving virtually maximum flow of engine coolant, or is disconnected and receiving no flow of engine coolant.

Referring again to FIG. 1, each heat exchange element 11a, 11b, 11c, 11d works in the region where a drop X1 in the water flow rate due to a reduction in engine speed produces a relatively small reduction Y1 in the heat transferred from each heat exchange element to the air entering the passenger compartment 2.

In the heater system described above all the control of heat to the air entering the passenger compartment through the ducts 45 and 46 is by controlling the coolant flow to the heat exchange elements 11a, 11b, 11c, 11d. The invention is also applicable to a heater system where warm air from the heat exchange elements 11a, 11b, 11c, 11d is mixed with air at ambient temperature before entering the passenger compartment. This is achieved by having an air passage which bypasses the heat exchange elements and a control valve which can progressively select cold air, heated air or a mixture of both.

In the modification shown in FIG. 7 the heater system forms part of an air conditioning system. Parts which have the same function or are substantially unmodified have the same reference numeral as referred to with reference to FIGS. 3 to 5 with the addition of 100.

In most respects the system is similar to that as previously described above with the exception that the air entering the heat exchanger has already passed through an evaporator 151 forming part of a cooler circuit.

The cooler circuit comprises the evaporator 151, an engine driven compressor 152, a condensor 153 a receiver 154 and an expansion valve 155.

The method of operation of such cooler circuits is well known to the man skilled in the art and will not be described here.

With such an arrangement air is forced through the evaporator 151 by the fan 144 where it is cooled before passage through the heat exchanger. When the ambient air is of relatively high humidity water vapour condenses in the evaporator 151 and is allowed to drain through a pipe 158.

For maximum cooling effect the heat exchanger will be switched off so that engine coolant bypasses all the heat exchange elements 111a, 111b, 111c, 111d.

The heater 104 may be used even where its output is less than the heat extracted by the evaporator 151 and this is within the scope of the invention even through the air entering the passenger compartment through the outlet ducts 145, 146 is at a lower temperature than that of the air at the inlet 150. This operating condition is likely where the ambient air is very humid.

For maximum heating effect the cooling circuit is switched off by disconnecting the compressor drive from the engine and supplying all of the heat exchange elements 11a, 11b, 11c, 11d with the first heat exchange fluid.

It will be appreciated by those skilled in the art that the engine coolant may be a water based coolant comprising antifreeze and corrosion inhibitors or may be oil forming part of the engine lubrication system.

I claim:

1. A heater system for the passenger compartment of a motor vehicle, the system comprising:

a housing forming a mixing chamber having an air inlet and at least one air outlet;

blower means for inducing air flow from said air inlet to the or each air outlet;

duct means for conducting air from the or each air outlet into the passenger compartment;

a valve assembly comprising a valve body defining a coolant inlet and a coolant outlet;

a heat exchanger comprising a number (n) of heat exchange elements arranged in a stack and each having a conduit for engine coolant connected to the valve body and air passages for air flowing between the air inlet and the air outlet, said conduits of the heat exchange elements being connected in parallel;

a valve chamber defined by the valve body;

a number of ports in the valve body opening into the valve chamber and each connected to a respective one of the heat exchange elements;

a valve member for selectively controlling flow between the coolant inlet and each port, the valve member being operable to allow flow through a progressively increasing number of heat exchange elements ranging between 0 and n;

a bypass passage which allows engine coolant to flow from the coolant inlet to the coolant outlet without passing through a heat exchange element when flow through a heat exchange element is prevented;

and a bypass orifice opening into the bypass passage, the bypass orifice being progressively closed by the valve member when the valve member is moved to open an increasing number of ports to allow flow through the heat exchange elements.

2. The heater system claimed in claim 1 wherein n is four.

3. The heater system claimed in claim 1 wherein the ports are arranged in staggered configuration so that as one port becomes fully open another port starts to open.

4. The heater system claimed in claim 3 wherein the valve body comprises a valve plate for sliding cooperation with the valve member.

* * * * *